United States Patent
Yazdanpanah et al.

(10) Patent No.: US 9,556,024 B2
(45) Date of Patent: Jan. 31, 2017

(54) INTEGRATED METHOD FOR GASIFICATION AND INDIRECT COMBUSTION OF SOLID HYDROCARBON FEEDSTOCKS IN A CHEMICAL LOOP

(71) Applicants: TOTAL SA, Courbevoie (FR); IFP Energies nouvelles, Rueil-Malmaison (FR)

(72) Inventors: Mahdi Yazdanpanah, Lyons (FR); Ann Forret, Longes (FR); Thierry Gauthier, Brignais (FR)

(73) Assignees: TOTAL SA, Courbevoie (FR); IFP ENERGIES NOUVELLES, Rueil-Malmaison (FR)

( * ) Notice: Subject to any disclaimer, the term of this patent is extended or adjusted under 35 U.S.C. 154(b) by 116 days.

(21) Appl. No.: 14/371,541

(22) PCT Filed: Nov. 20, 2012

(86) PCT No.: PCT/FR2012/000473
§ 371 (c)(1),
(2) Date: Jul. 10, 2014

(87) PCT Pub. No.: WO2013/104836
PCT Pub. Date: Jul. 18, 2013

(65) Prior Publication Data
US 2015/0013575 A1    Jan. 15, 2015

(30) Foreign Application Priority Data
Jan. 11, 2012    (FR) .................... 12 00085

(51) Int. Cl.
*C01B 3/36*    (2006.01)
*C01B 3/02*    (2006.01)
(Continued)

(52) U.S. Cl.
CPC .................. *C01B 3/02* (2013.01); *C10J 3/482* (2013.01); *C10J 3/725* (2013.01); *F23C 13/06* (2013.01);
(Continued)

(58) Field of Classification Search
CPC ....................................................... C10J 3/725
See application file for complete search history.

(56) References Cited

U.S. PATENT DOCUMENTS 3,031,287 A    4/1962    Benson et al.
4,343,624 A    8/1982    Belke et al.
(Continued)

FOREIGN PATENT DOCUMENTS

CN    101261010 A    9/2008
CN    101289185 A    10/2008
(Continued)

OTHER PUBLICATIONS

Office Action of Chinese Appln. No. 201280066773.9 dated Aug. 7, 2015 with English translation.
(Continued)

*Primary Examiner* — Imran Akram
(74) *Attorney, Agent, or Firm* — Fitch, Even, Tabin & Flannery, LLP

(57) ABSTRACT

The invention relates to an integrated method for gasification and indirect combustion of a solid hydrocarbon feedstock in a chemical loop, comprising:
contacting solid hydrocarbon feedstock (1) with water (2) in a gasification reaction zone RG in order to discharge ashes (9) and to produce a gaseous effluent (3) comprising syngas and water,
supplying reduction reaction zone RR of a redox chemical loop with at least part of gaseous effluent (3) produced in the gasification reaction zone in order to produce a $CO_2$ and $H_2O$-concentrated gaseous effluent (4),
(Continued)

reoxidizing the oxygen-carrying solid particles from reduction reaction zone RR of the chemical loop in oxidation reaction zone RO by means of an oxidizing gas (6) and discharging fumes (7).

The invention also relates to a plant allowing said integrated method to be implemented.

7 Claims, 2 Drawing Sheets

(51) Int. Cl.
  *C10J 3/48* (2006.01)
  *C10J 3/72* (2006.01)
  *F23C 13/06* (2006.01)
(52) U.S. Cl.
  CPC . *C10J 2300/0976* (2013.01); *C10J 2300/1807* (2013.01); *C10J 2300/1853* (2013.01); *C10J 2300/1876* (2013.01); *C10J 2300/1892* (2013.01)

(56) References Cited

U.S. PATENT DOCUMENTS

| | | |
|---|---|---|
| 4,435,374 A | 3/1984 | Helm, Jr. |
| 5,447,024 A | 9/1995 | Ishida et al. |
| 2008/0134579 A1 | 6/2008 | Kulkarni et al. |
| 2010/0290975 A1* | 11/2010 | Andrus, Jr. ............ C01B 3/344 423/418.2 |
| 2010/0299997 A1* | 12/2010 | Hoteit ...................... C01B 3/36 48/210 |
| 2011/0303875 A1* | 12/2011 | Hoteit ...................... C01B 3/42 252/373 |
| 2012/0167585 A1* | 7/2012 | Wormser ............... C10K 1/024 60/781 |
| 2012/0171588 A1* | 7/2012 | Fan ........................ C01B 3/063 429/418 |
| 2012/0299302 A1* | 11/2012 | Guyomarc'h et al. . F01K 13/00 290/52 |

FOREIGN PATENT DOCUMENTS

| | | | |
|---|---|---|---|
| CN | 101392188 A | 3/2009 | |
| CN | 102300962 A | 12/2011 | |
| FR | WO 2010086529 A1 * | 8/2010 | ............... C01B 3/42 |

OTHER PUBLICATIONS

Office Action of CN Appln. No. 201280066773.9 dated Mar. 9, 2016 with English translation.

* cited by examiner

INTEGRATED METHOD FOR GASIFICATION AND INDIRECT COMBUSTION OF SOLID HYDROCARBON FEEDSTOCKS IN A CHEMICAL LOOP

FIELD OF THE INVENTION

The invention relates to an integrated method for gasification and indirect combustion of solid hydrocarbons in a redox chemical loop, for the production of heat and/or of syngas CO+H2.

TERMINOLOGY

Chemical Looping Combustion method or CLC: In the text hereafter, what is referred to as CLC (Chemical Looping Combustion) is an oxidation reduction or redox looping method using an active mass. It can be noted that, in general, the terms oxidation and reduction are used in connection with the respectively oxidized or reduced state of the active mass. The oxidation reactor is the reactor where the redox mass is oxidized and the reduction reactor is the reactor where the redox mass is reduced.

BACKGROUND OF THE INVENTION

In a context of increasing world energy demand, capture of carbon dioxide for sequestration thereof has become an imperative necessity in order to limit greenhouse gas emissions harmful to the environment. The Chemical Looping Combustion (CLC) method allows to produce energy from hydrocarbon-containing fuels while facilitating capture of the carbon dioxide emitted during the combustion.

An oxygen carrier (metallic oxide) is used for continuous transfer of the oxygen from the "air reactor" or "oxidation reactor" (RO) to the "fuel reactor" or "combustion reactor" or "reduction reactor" (RR) where the oxygen is provided to the fuel. Thus, direct contact between the air and the fuel is prevented. The resulting gas is rich in $CO_2$ and it is not diluted with nitrogen. It can thus be compressed and stored after simple condensation of the water produced. The reduced oxygen carrier (Me) is then sent to the air reactor in order to be reoxidized (to MeO), thus forming a chemical loop.

Solid fuels having a high carbon to hydrogen ratio produce large amounts of greenhouse gas. Thus, the combustion of solid fuels is a particularly interesting application for the CLC method. Various CLC configurations have already been developed and tested on the laboratory scale for the combustion of solids. However, additional research work is necessary to guarantee the feasibility of the method. The most important technological challenges for the CLC method with solid feedstocks relate to the solid—solid separation (oxygen carrier—unburnt solid fuel) and to the high-pressure operation of the method.

In order to overcome the aforementioned drawbacks, a new system is provided for burning (and/or gasifying) a solid fuel without direct contact between the oxygen carrier and the fuel.

SUMMARY OF THE INVENTION

The invention relates to an integrated method for gasification and indirect combustion of a solid hydrocarbon feedstock in a chemical loop, comprising:
- contacting solid hydrocarbon feedstock (1) with water (2) in a gasification reaction zone RG in order to discharge ashes (9) and to produce a gaseous effluent (3) comprising syngas CO, $H_2$ and water $H_2O$,
- supplying reduction reaction zone RR of a redox chemical loop, wherein oxygen-carrying solid particles Me/MeO circulate, with at least part of gaseous effluent (3) produced in the gasification reaction zone in order to produce a $CO_2$ and $H_2O$-concentrated gaseous effluent (4),
- reoxidizing the oxygen-carrying solid particles from reduction reaction zone RR of the chemical loop in oxidation reaction zone RO by means of an oxidizing gas (6) and discharging fumes (7).

Preferably, a part (5) of the $CO_2$ and $H_2O$-concentrated effluent is recycled so as to supply gasification reaction zone RG with oxygen.

In a first embodiment, reduction reaction zone RR is supplied with all of the gaseous effluent (3) produced in gasification reaction zone RG in order to produce heat that is recovered in oxidation reaction zone RO or on the gaseous effluent transport lines.

In another embodiment, reduction reaction zone RR is supplied with a part (3a) of the gaseous effluent produced in gasification reaction zone RG in sufficient amount to produce the energy required for the gasification reaction, the other part (3b) allowing syngas CO+H2 to be produced.

The solid hydrocarbon feedstock is preferably selected from among coal, coked catalysts from the fluidized bed catalytic cracking method (FCC) or cokes produced by flexicoker units.

The invention also relates to a gasification and chemical looping combustion plant comprising:
- a gasification reaction zone RG supplied with a solid hydrocarbon feedstock (1) and with water ((2), comprising a discharge line for a gaseous effluent containing syngas and water (3), and a discharge line for the ashes produced (9),
- a chemical combustion loop comprising a reduction reaction zone RR and an oxidation reaction zone RO,
said reduction reaction zone RR being supplied with at least part of gaseous effluent (3) from gasification zone RG and through a line transporting the oxygen-carrying solid particles (MeO) from said oxidation zone RO, and comprising a discharge line for a gaseous effluent (4) containing $CO_2$ and $H_2O$,
and said oxidation reaction zone RO being supplied with an oxidizing gas (6) and through a line transporting the reduced oxygen-carrying solid particles (Me) from the reduction reaction zone, and comprising a transport line for discharging fumes (7).

The plant can comprise a transport line for carrying a part (5) of the gaseous effluent comprising $CO_2$ and $H_2O$ (4) to the feed point of gasification zone RG.

In an embodiment, the plant can also comprise at least one heat exchanger in oxidation zone RO (E1) and/or on fumes transport line (7) (E2).

In another embodiment, the gaseous effluent (3) discharge line divides into two lines allowing supply of reduction zone RR with syngas for combustion (3a) and discharge of the syngas produced (3b).

DETAILED DESCRIPTION

Gasification of the Solid Fuel

The gasification reaction of the solid hydrocarbon feedstock occurs in the gasification reaction zone, in the presence of water vapour and possibly $CO_2$ (if part of the fume is recycled from the outlet of combustion reactor RR to the feed point of gasification zone RG). The water fed into the gasification zone can be vaporized and/or under pressure.

Under the operating conditions of the method according to the invention, i.e. a temperature advantageously ranging between 800° C. and 1100° C., a pressure advantageously ranging between 1 and 20 bars, and a $H_2O$/feedstock ratio advantageously ranging between 7 and 10, gasification is complete, so that only syngas CO+H2 and residual water are produced. At the gasification zone outlet, the ashes produced by the gasification of the solid hydrocarbon feedstock are also collected.

The gasification reaction is endothermic, the energy required is provided at least partly by the exothermic combustion of all or part of the syngas produced in the chemical loop.

When all the syngas produced is sent to the combustion zone of the chemical loop, the energy provided by the combustion of the syngas is in excess in relation to the gasification reaction needs. It is then possible to recover the excess energy in form of heat, by means of one or more exchangers arranged in the oxidation zone or on the gas transport lines.

When only part of the syngas is sent to the combustion zone of the chemical loop, the energy provided by the combustion of the syngas is preferably used only to meet the gasification reaction needs. In this case, in order to allow the syngas production to be maximized at the process outlet, part of the syngas has to be sent to combustion zone RR in a proportion strictly necessary to obtain the energy required for gasification.

Chemical Looping Combustion Reaction of the Syngas

The CLC method consists in conducting redox reactions of an active mass for breaking down the combustion reaction into two successive reactions. A first reaction of oxidation of the active mass, with air or a gas as the oxidizer, allows the active mass to be oxidized.

A second reaction of reduction of the active mass thus oxidized, by means of a reducing gas, then allows to obtain a reusable active mass and a gaseous mixture essentially comprising carbon dioxide and water, or even syngas containing hydrogen and nitrogen monoxide. This technique thus allows to isolate the carbon dioxide or the syngas in a gaseous mixture practically free of oxygen and nitrogen.

The combustion being globally exothermic, it is possible to produce energy from this method, in form of vapour or electricity, by arranging exchange surfaces in the active mass circulation loop or on the gaseous effluents downstream from the combustion or oxidation reactions.

U.S. Pat. No. 5,447,024 describes a chemical looping combustion method comprising a first reduction reactor for reducing an active mass by means of a reducing gas and a second oxidation reactor allowing to restore the active mass in its oxidized state by means of an oxidation reaction using wet air. The circulating fluidized bed technology is used to allow continuous change of the active mass from its oxidized state to its reduced state.

As it changes alternately from its oxidized state to its reduced state and conversely, the active mass follows a redox cycle.

Thus, in the reduction reactor, the active mass ($M_xO_y$) is first reduced to the state $M_xO_{y-2n-m/2}$ by means of a hydrocarbon $C_nH_m$ (the syngas here) that is correlatively oxidized to $CO_2$ and $H_2O$, according to reaction (1), or optionally in admixture $CO+H_2$ depending on the proportions used.

$$C_nH_m + M_xO_y \rightarrow nCO_2 + m/2 H_2O + M_xO_{y-2n-m/2} \quad (1)$$

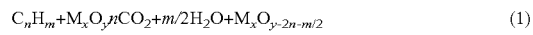

In the oxidation reactor, the active mass is restored to its oxidized state ($M_xO_y$) on contact with air according to reaction (2), prior to being sent back to the first reactor.

$$M_xO_{y-2n-m/2} + (n+m/4)O_2 \rightarrow M_xO_y \quad (2)$$

In the above equations, M represents a metal.

The efficiency of the chemical looping combustion (CLC) method using a circulating fluidized bed is due to a large extent to the physico-chemical properties of the redox active mass.

The chemical looping redox combustion plant comprises an oxidation reaction zone and a reduction reaction zone.

The oxygen-carrying solid is oxidized in an oxidation zone comprising at least one fluidized bed at a temperature generally ranging between 700° C. and 1200° C., preferably between 800° C. and 1100° C. It is then transferred to a reduction zone comprising at least one fluidized bed reactor where it is contacted with the fuel (the syngas here) at a temperature generally ranging between 700° C. and 1200° C., preferably between 800° C. and 1100° C. The contact time typically ranges between 10 seconds and 10 minutes, preferably between 1 and 5 minutes. The ratio of the amount of circulating active mass to the amount of oxygen to be transferred between the two reaction zones advantageously ranges between 20 and 100.

Within the context of the integrated method according to the invention, the combustion of the syngas in reduction zone RR is total, the gas stream at the reduction reactor outlet essentially consists of $CO_2$ and of water vapour. A $CO_2$ stream ready to be sequestered is then obtained by condensation of the water vapour. The energy production is integrated in the chemical looping combustion CLC method by means of a heat exchange in the reaction zone and on the fumes of the oxidation zone that are cooled.

LIST OF THE FIGURES

FIG. 1 shows the integrated method according to the invention with gasification of the solid fuel, then chemical looping combustion of the syngas produced, in its application for heat production.

FIG. 2 shows the integrated method according to the invention with gasification of the solid fuel, then chemical looping combustion of part of the syngas produced, so as to provide the energy required for gasification of the feedstock, in its application for syngas production.

FIG. 3 illustrates the example and represents the thermodynamic equilibrium results of 90% $H_2O$ and 10% Carbon simulated with the CHEMKIN™ software.

DESCRIPTION OF THE FIGURES

The system for implementing the integrated gasification and chemical looping combustion method according to the invention is made up of three main reactors: a gasification reactor RG, a reduction reactor RR and an oxidation reactor RO.

Description of FIG. 1.

Figure 1:
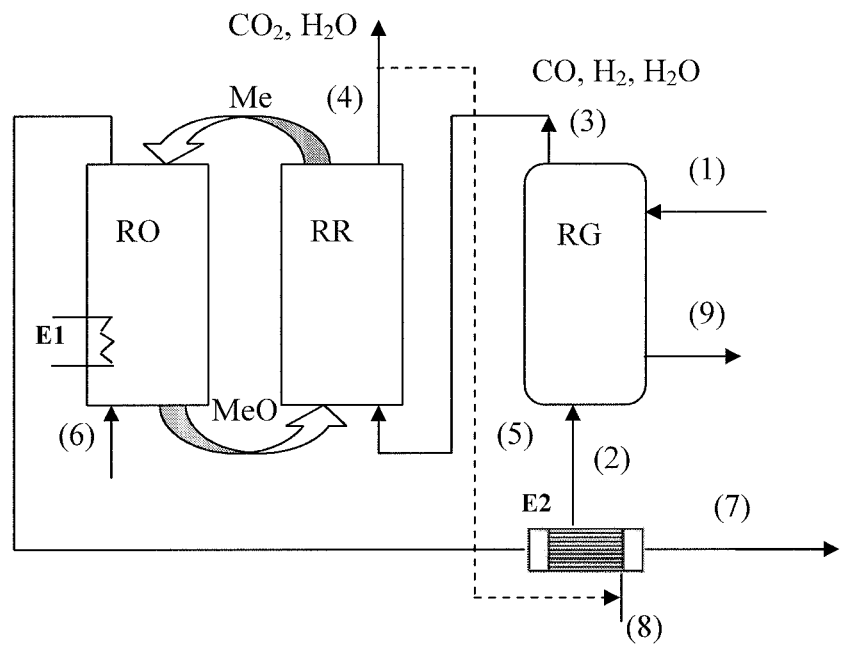
FIG. 1 illustrates the method according to the invention with indirect combustion of the solid hydrocarbon feedstock for heat production.

Solid fuel (1) is first gasified in the presence of water vapour (2) in gasification reactor RG. The effluent obtained (CO+H2) comprising syngas CO+H2 (3) is then carried to reduction reactor RR where the gas is burnt in contact with the oxygen carrier (Me/MeO) that circulates in the chemical loop as particles. Combustion gas (4) leaving reduction reactor RR essentially contains $CO_2$ and $H_2O$. Thus, the $CO_2$ can be readily separated by condensing the water vapour. A fraction of this gaseous effluent essentially comprising $CO_2$ and $H_2O$ (5) can be injected into gasification reactor RG in order to maintain the temperature or to supply oxygen for gasifying the fuel. The oxygen carrier in the reduced state Me is then sent to oxidation reactor RO where it is reoxidized on contact with the air introduced as oxidizing gas (6). The oxidation degree difference between the oxygen carrier in the reduced state (Me) at the outlet of RR and the oxygen carrier in the oxidized state (MeO) at the outlet of RO is $\Delta X$.

A heat exchanger E present in oxidation reactor (E1) or on a transport line (E2) carrying the fumes from oxidation zone RO allows the energy to be recovered in form of heat.

In a preferred embodiment, the fumes from oxidation zone RO (7) can be cooled in exchanger E2 by heat exchange with water in liquid form (8) in order to supply the gasification reactor with water (2) in vapour form and/or under pressure. This also affords the advantage of discharging cooled fumes (7) from the plant. Ashes (9) are also discharged of the plant from gasification zone RG.

Figure 2:
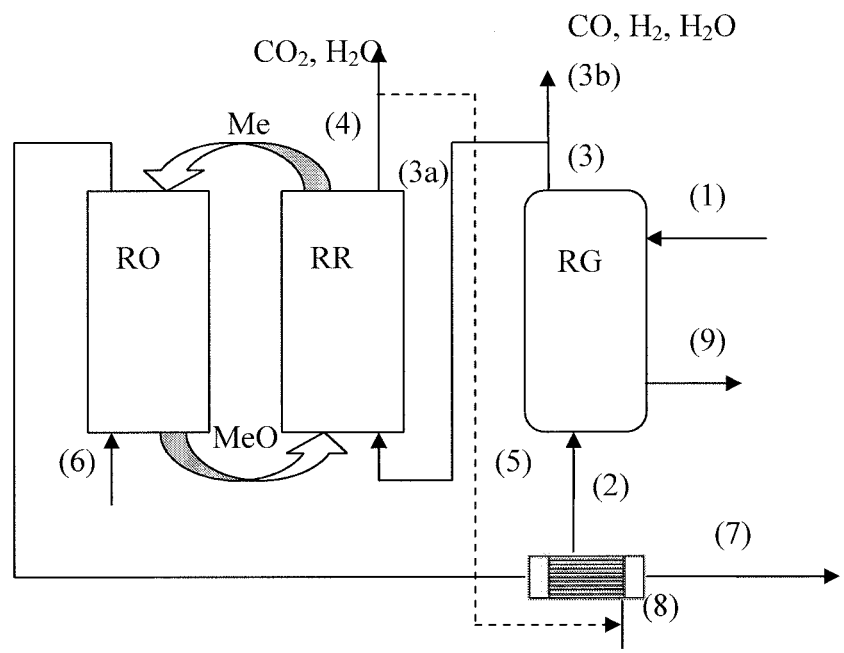

Description of FIG. 2:

FIG. 2 illustrates the integrated method according to the invention with gasification of the solid hydrocarbon feedstock allowing both production of syngas CO+H2 and production of the heat required for the gasification reaction. The scheme of the gasification and indirect combustion system in its application for the production of syngas is presented in FIG. 2. This system is similar to the configuration of the combustion method presented above, with a modification at the outlet of gasification reactor RG for gas (3). In this scheme, only a fraction of syngas (3a) produced in RG is sent to combustion reactor RR to produce the heat required for gasification. The other part of the syngas (3b) is considered as the product of the process and it is discharged from the plant. The water vapour in the syngas can be condensed later so as to improve the calorific value of the gas.

The method can thus be used to produce syngas. This syngas can be used as feedstock for other chemical conversion methods, for example the Fischer-Tropsch method allowing to produce, from syngas, liquid hydrocarbons with long hydrocarbon chains usable as fuel bases.

Advantages of the Method According to the Invention

The method according to the invention has many advantages.

Since there is no direct contact between the oxygen carrier and the (previously gasified) fuel, the device allowing to implement the method according to the invention can be readily adapted to existing combustion methods by replacing the inflowing air by water vapour and $CO_2$.

The integrated method according to the invention makes a solid-solid separation (oxygen carrier-unburnt solid fuel) unnecessary since the fuel is only contacted with the oxygen-carrying particles once gasified, a separation that was necessary so far in the published CLC methods for solid feedstocks.

The method according to the invention, in its two embodiments, can operate at a high pressure in gasification reactor RG, whereas reactors RO and RR operate at atmospheric pressure. This notably allows to produce syngas at high pressure (for the Fischer-Tropsch method for example). Furthermore, since reaction zones RO and RR operate at atmospheric pressure, the integrated method according to the invention allows to decrease the operating cost and the cost of the building materials for reactors RO and RR. Finally, fuel leakage to reactors RO and RR is minimized, as well as the loss of oxygen carrier to gasification reactor RG.

Gasification being carried out with water vapour and not with air (absence of nitrogen), the syngas obtained has a high calorific value.

Gasification being carried out with water vapour and not with air (absence of nitrogen), the production of nitrogen oxides is minimized.

The main limit of these methods is the supply of heat to the gasification reactor because the gases have a limited heat capacity. In a preferred embodiment, overheated water vapour is injected (at a temperature advantageously close to 1000° C. for example). It can be noted that, by means of water vapour injection (and possibly $CO_2$ from the fumes coming from the reduction zone), 2 to 5 times as much oxygen is supplied to the gasification reactor in relation to the case where only air is injected directly into the reactor. This difference is due to the fact that the nitrogen in the air is replaced by $H_2O$ or $CO_2$.

Gasification can be carried out at atmospheric pressure or under pressure. In case of gasification under pressure (for example at pressures ranging between 5 and 50 bars, preferably between 20 and 40 bars), the water vapour required for gasification results from a vapour cycle supplied at least partly with water resulting from the fumes of the reduction reactor wherein the heat required for preheating and pressurizing the vapour is recovered by exchange with the fumes of oxidation reactor (RO).

Various types of reactor can be used in the different reaction zones RG, RO and RR of the method according to the invention. Gasification reactor RG can notably be a circulating fluidized bed or an ebullating fluidized bed boiler. The technological range of oxidation RO and combustion RR reactors that can be selected is also wide. These reactors can be ebullating fluidized bed or circulating bed reactors.

The solid hydrocarbon feedstocks used in the method according to the invention can be selected from among all the types of solid hydrocarbon fuels, notably coal, biomass, coked catalysts from the fluidized catalytic cracking process (FCC) or cokes produced by the flexicoker process, taken alone or in admixture.

The hydrocarbon feedstocks are fed into gasification reactor RG in form of a dispersed solid of average diameter generally ranging between 10 microns and 5 mm, preferably between 50 microns and about 1 mm.

The efficiency of the chemical looping combustion (CLC) method using a circulating fluidized bed is due to a large extent to the physico-chemical properties of the redox active mass. The reactivity of the redox pair(s) involved and the associated oxygen transfer capacity are parameters that influence the dimensioning of reactors RO and RR, as well as the rates of circulation of the particles. The life of the particles depends on the mechanical strength of the particles and on the chemical stability thereof. In order to obtain particles usable for this method, the particles used generally consist of a redox pair or of a set of redox pairs selected from among CuO/Cu, Cu2O/Cu, NiO/Ni, Fe2O3/Fe3O4, FeO/Fe, Fe3O4/FeO, MnO2/Mn2O3, Mn2O3/Mn3O4, Mn3O4/

MnO, MnO/Mn, Co3O4/CoO, CoO/Co, and of a binder providing the required physico-chemical stability. Synthetic or natural ores can be used.

Big particles are more difficult to transport and require high transport rates. In order to limit the transport rates in the transfer lines and within the reactors, and thus to limit pressure drops in the process, as well as abrasion and erosion phenomena, the size of the oxygen-carrying material particles is therefore preferably limited to a maximum value close to 500 microns.

Preferably, the grain size of the oxygen-carrying material fed into the chemical looping combustion plant is such that more than 90% of the particles have a size ranging between 100 and 500 microns.

More preferably, the grain size of the oxygen-carrying material fed into the plant is such that more than 90% of the particles have a particle diameter ranging between 150 and 300 microns.

More preferably yet, the grain size of the material fed into the plant is such that more than 95% of the particles have a diameter ranging between 150 and 300 microns.

The method according to the invention can be advantageously integrated in a refinery.

EXAMPLE

Figure 3:
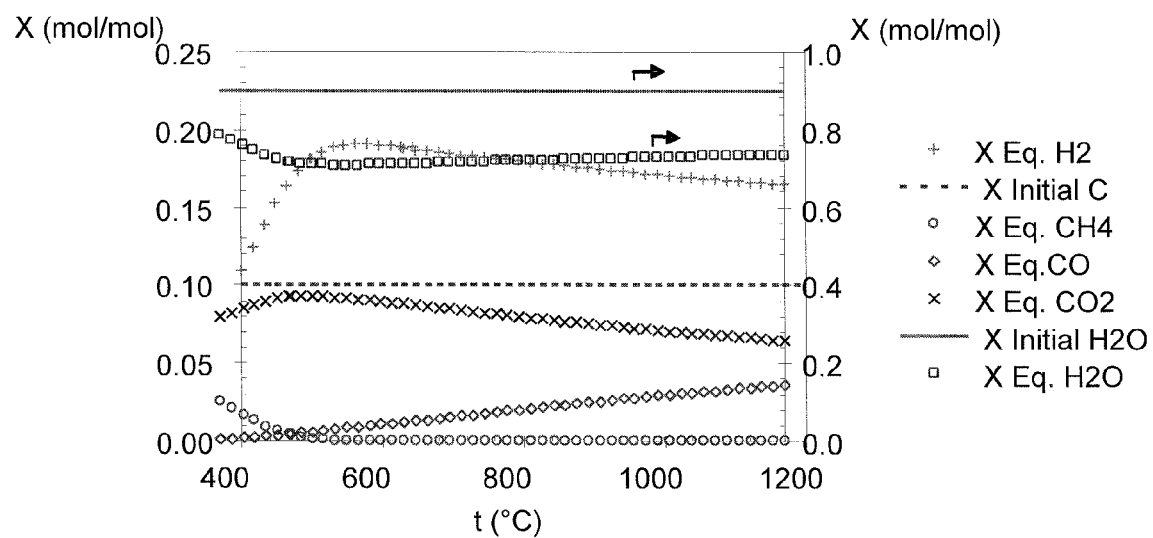

In the example below, the main reactor is the gasification reactor (RG). FIG. 3 shows the thermodynamic equilibrium concentrations (Xeq) of the gases in reactor RG. These results clearly show that, at equilibrium, nearly all of the carbon injected is converted to $CO_2$. The CO concentration is very low at approximately 600° C., but it increases with the temperature. This graph and the material balance are used to calculate the various gas proportions at the outlet of reactor RG.

The thermodynamic equilibrium results of 90% $H_2O$ and 10% carbon were therefore simulated with the CHEMKIN™ software.

A steady state zero-order model was developed to study the feasibility of this system. The coal is injected into the bed at a flow rate of 3 kg/h. The properties of the coal injected are given in Table 1. Gasification was carried out with water vapour overheated to 1000° C. and a mass flow rate of 27 kg/s (equivalent to the stoichiometric air flow rate required for complete combustion). The properties of the syngas at the outlet of reactor RG are given in Table 2. The concentrations are calculated on the thermodynamic basis and with the material balance. The temperature at the outlet of reactor RG is 600° C. and the average temperature of reactor RG is 800° C.

TABLE 1

Properties (ultimate analysis) of the coal used for the case studied, with LHV = 28 MJ/kg.

| Components | Wt. % | Wt. % (minus water, ashes) |
|---|---|---|
| Carbon (C) | 64% | 72% |
| Hydrogen (H) | 5% | 6% |
| Nitrogen (N) | 1% | 1% |
| Total sulfur (S) | 1% | 1% |
| Oxygen (O) | 18% | 20% |
| Ashes | 12% | |

TABLE 2

Concentrations of the various gases at the outlet of gasification reactor RG.

| Components | Wt. % | Flow rate (kg/s) | Flow rate (mol/s) | Concentration (mol %) | Concentration (minus water, mol %) |
|---|---|---|---|---|---|
| $CO_2$ | 13.0% | 3.95 | 0.141 | 8% | 28% |
| $H_2O$ | 81.4% | 22.93 | 1.273 | 71% | |
| CO | 1.8% | 0.51 | 0.018 | 1% | 4% |
| $H_2$ | 2.5% | 0.70 | 0.347 | 19% | 68% |
| $CH_4$ | 0.0% | 0.00 | 0.000 | 0% | 0% |
| $N_2$ | 0.1% | 0.03 | 0.001 | 0% | 0% |
| $SO_2$ | 0.2% | 0.04 | 0.0007 | 0% | 0% |

All or part of the syngas produced in gasification reactor RG can be sent to the combustion reactor in order to produce energy.

In the case of syngas production, only part of the gas required to maintain the overall energy balance is sent to combustion reactor RR. In the present example, the required minimum fraction to be sent to the combustion reactor is 53%. This system can thus deliver 47% of syngas as product.

In the case of heat production, during combustion, all of the syngas is burnt in reduction reactor RR in order to produce energy.

The invention claimed is:

1. An integrated method for gasification and indirect combustion of a solid hydrocarbon feedstock in a chemical loop, comprising:
   contacting solid hydrocarbon feedstock with water in a gasification reaction zone RG to conduct an endothermic gasification reaction, discharge ashes and produce a gaseous effluent comprising syngas CO, $H_2$ and $H_2O$, wherein oxygen for the endothermic gasification reaction is supplied only from the water or the water and $CO_2$;
   supplying reduction reaction zone RR of a redox chemical loop wherein oxygen-carrying solid particles Me/MeO circulate with at least part of gaseous effluent comprising syngas CO, $H_2$ and $H_2O$ produced in the gasification reaction zone to reduce the oxygen-carrying solid particles Me/MeO and combust the syngas to produce a $CO_2$ and $H_2O$-concentrated gaseous effluent; and
   reoxidizing the oxygen-carrying solid particles from reduction reaction zone RR of the chemical loop in oxidation reaction zone RO by means of an oxidizing gas and discharging fumes;
   wherein contacting of the solid feedstock with water in the gasification reaction zone is performed without direct contact with the oxygen-carrying solid particles Me/MeO, and
   wherein energy required for the endothermic gasification reaction in gasification reaction zone RG is provided at least partly by exothermic combustion of all or part of the syngas in the redox chemical loop.

2. An integrated gasification and chemical looping combustion method as claimed in claim 1, wherein a part of the CO2 and $H_2O$-concentrated effluent produced in reduction zone RR is recycled so as to supply gasification reaction zone RG with oxygen.

3. An integrated gasification and chemical looping combustion method as claimed in claim 1, wherein reduction reaction zone RR is supplied with all of the gaseous effluent produced in gasification reaction zone RG in order to produce heat that is recovered in oxidation reaction zone RO or on the gaseous effluent transport lines.

4. An integrated gasification and chemical looping combustion method as claimed in claim 1, wherein reduction reaction zone RR is supplied with only a part of the gaseous effluent produced in gasification reaction zone RG in sufficient amount to produce the energy required for the gasification reaction, a remainder of the gaseous effluent produced in gasification reaction zone RG not supplied to the reduction reaction zone RR allowing syngas CO+H2 to be produced.

5. An integrated gasification and chemical looping combustion method as claimed in claim 1, wherein the solid hydrocarbon feedstock is selected from among coal, coked catalysts from the fluidized bed catalytic cracking method or cokes produced by flexicoker units.

6. An integrated gasification and chemical looping combustion method as claimed in claim 1, wherein the oxygen-carrying solid particles Me/MeO in the reduced state Me are sent directly from the reduction reaction zone RR to the oxidation reaction zone RO.

7. An integrated gasification and chemical looping combustion method as claimed in claim 2, wherein the part of the CO2 and H2O-concentrated effluent is supplied to a feed point of the gasification reaction zone RG comprising water in liquid form, and wherein the method further comprises cooling the fumes from the oxidation reaction zone RO in at least one heat exchanger by heat exchange with the water in liquid form, thereby heating the water in liquid form to provide water in vapour form and/or under pressure, the water in vapour form and/or under pressure being supplied to the gasification reaction zone RG.

\* \* \* \* \*